E. C. & J. W. NEWLAND.
Hoe.
No. 37,405.
Patented Jan. 13, 1863.
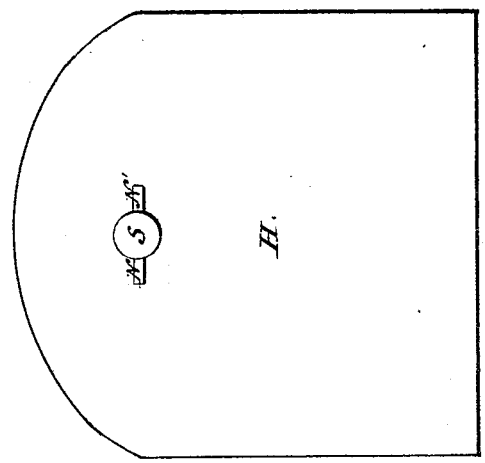
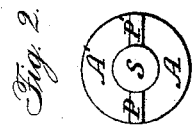
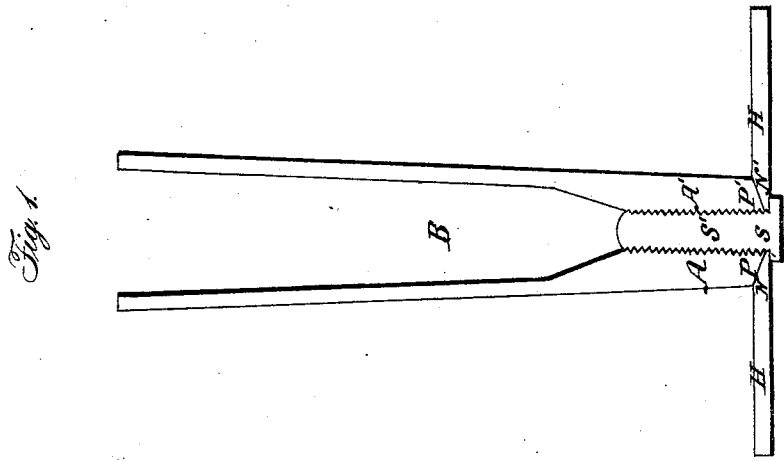
Witnesses:
Newton H. Malok.
James L. East.
Inventor:
Elisha C. Newland.
John W. Newland.

UNITED STATES PATENT OFFICE.

ELIHU C. NEWLAND AND JOHN W. NEWLAND, OF BEDFORD, INDIANA.

IMPROVEMENT IN HOES.

Specification forming part of Letters Patent No. 37,405, dated January 13, 1863.

*To all whom it may concern:*

Be it known that we, ELIHU C. NEWLAND and JOHN W. NEWLAND, of Bedford, in the county of Lawrence and State of Indiana, have invented a new and useful Mode of Attaching the Handles to Hoes; and we do hereby declare that the following is a full and exact description thereof, reference being had to the accompanying drawings and letters of reference marked thereon.

The nature of our invention consists in fastening the hoe to the handle by means of a screw passing through the hoe into a socket fixed on the end of the handle, and in making the hoe perfectly stationary by means of projections on the end of the socket, which enter corresponding notches in the hoe, the socket to be made of wrought or malleable cast iron.

To enable others skilled in the art to make and use our invention, we proceed to describe its construction and operation.

Figure 1 in the accompanying drawings represents a lateral section of the socket, hoe, and screw; A A', the socket; P P', the projections aforesaid; N N', the corresponding notches in the hoe; H H, the hoe; B, the opening in the socket for the handle.

Fig. 2 represents the end of the socket next the hoe.

Fig. 3 represents the side of the hoe next to the socket.

Like letters in the different figures represent the same part of the instrument.

We take an ordinary hoe made of steel. At the proper place in the hoe we make a hole for the screw to pass through, as shown by S in Figs. 1, 2, and 3. Around the hole and on the side of the hoe next the socket we cut two or more notches, as shown by N N' in Figs. 1 and 3, slanting outward to the rim of the socket. We then prepare a socket, A A', Fig. 1, of wrought or malleable cast iron and of sufficient length to admit the screw at one end and the hoe-handle at the other. In the end of the socket next the hoe we form a concave screw adapted to the convex screw S', Fig. 1, which unites the socket and hoe. On the end of the socket we form two or more projections, as shown at P P', Figs. 1 and 2, to fit in the notches in the hoe-plate aforesaid. We then adjust the socket to the hoe, fitting the projections in the notches, and fasten the two together by means of a screw, as shown in Fig. 1. Insert a wooden handle in the socket and the hoe is ready for work.

What we claim as our invention, and desire to secure by Letters Patent, is—

The arrangement of the socket A, provided with the projections P P', and the plate H, having corresponding notches and attached to the socket by means of the screw S, all constructed and operating as and for the purposes described.

ELIHU C. NEWLAND.
JOHN W. NEWLAND.

Witnesses:
NEWTON F. MALOTT,
JAMES L. EAST.